3,850,860
PROCESS FOR DYEING EXPANDABLE
THERMOPLASTIC POLYMERS
Stuart B. Smith, Chelmsford, Mass., assignor to Foster
Grant Co., Inc., Leominster, Mass.
No Drawing. Continuation-in-part of abandoned application Ser. No. 245,303, Apr. 13, 1972. This application June 28, 1973, Ser. No. 374,608
Int. Cl. C08j 1/26; D06p 3/00
U.S. Cl. 260—2.5 B
17 Claims

ABSTRACT OF THE DISCLOSURE

Expandable alkenyl aromatic polymer in particulate form is colored by blending the polymer with a non-aqueous solution comprised of an organic liquid in which the polymer is insoluble, an organic liquid in which the polymer is soluble and an organic liquid-soluble dye.

---

This application is a continuation-in-part of co-pending application S.N. 245,303 filed Apr. 13, 1972 as being now abandoned.

BACKGROUND OF THE INVENTION

This invention relates to the coloring of expandable thermoplastic polymeric materials and more particularly to an improved method of coloring expandable thermoplastic alkenyl aromatic polymers in particulate form.

Thermoplastic polymers, especially those made from alkenyl aromatic monomers, e.g., polystyrene, are widely used in the manufacture of molded products such as wall paneling and packaging materials. It is often desirable that the finished products have a color different than the natural color of the polymer and accordingly the polymer is frequently colored, oil-soluble dyes usually being used for this purpose. In the case of general purpose polymer this is easily accomplished by dry-blending the polymer in particulate form with the dye. To provide a colored particulate general purpose polymer having the dye uniformly distributed throughout the polymer it is only necessary to extrude and pelletize the dry blended polymer.

Although the above method is generally satisfactory for coloring general purpose materials it is not very suitable for making colored particulate expandable polymer. When it is desired to color expandable thermoplastic materials in particulate form, it is usually preferred to color the particles without extruding and pelletizing the polymer so that the danger of losing some or all of the blowing agent contained in the particles is minimized. However, attempts to color expandable polymeric particles by simply dry-blending the particles with a dye have generally proved unsatisfactory because the dye is merely deposited upon the outside surfaces of the polymeric particles and it has a tendency to dust off, a phenomenon known as crocking. This is very undesirable not only because articles molded from such polymer will not maintain their color, but also because the dye easily rubs off onto objects or clothing which come in contact with the molded article. Furthermore, if the molded article is cut, the newly exposed surface will have a severely mottled appearance due to the failure of the dye to penetrate into the interior portions of the polymeric particles.

In order to improve the quality of colored expanded polymer products better coloring methods are constantly being sought. Until the present time one of the more satisfactory methods used to color expandable thermoplastic particles, for example beads, comprises suspending the particles in an aqueous medium and contacting them with a solution comprised of an organic liquid-soluble dye and an organic liquid capable of penetrating the polymer particles. U.S. Pat. No. 3,020,247 issued to Bianco on Feb. 6, 1962, discloses a process in which expandable polystyrene beads are suspended in an aqueous medium and dyed with a solvent-soluble dye in the presence of certain organic solvents. U.S. Pat. No. 3,339,025, issued to Nicholson on Aug. 27, 1968, discloses a similar process except that the dyeing step is carried out at super-atmospheric pressures using an organic liquid capable of penetrating the polymer. U.S. Pat. No. 3,632,288, issued to Niechwiadowicz et al. on Jan. 4, 1972, discloses an improved process in which expandable thermoplastic beads which are suspended in an aqueous medium contained in a closed vessel are contacted with a small amount of certain aromatic liquids in which the polymer is soluble and an organic solvent-soluble dye. The organic solvent disrupts the surface layer of polymer thereby facilitating the influx of dye to the interior portions of the beads. Although these processes are effective, they present the disadvantages that the polymeric particles must be suspended in an aqueous medium while they are being dyed, and after the dyeing step is completed the particles must be separated from the water and thoroughly dried so that they will be free flowing. The suspension and drying steps considerably increase the cost of the dyeing process. In addition, great care must be exercised to ensure that excessive amounts of blowing agent are not lost during the dyeing and drying steps. Furthermore, the above suspension dyeing processes can only be practiced when dyeing polymer particles having a size such that they are capable of being suspended in an aqueous medium. Each of the above-mentioned patents, disclose a process wherein the expandable or expanded thermoplastic particles are (1) suspended in an aqueous medium; (2) contacted with a dye plus other dyeing aids in this aqueous suspension; the particles are (3) separated from the aqueous medium and (4) dried. In the applicant's invention there is no need to use the aqueous suspension medium of the prior art hence there is no need to separate and dry the colored expandable particles. In addition all of these prior art processes require the use of elevated temperatures to bring about coloring of the thermoplastic particles.

SUMMARY OF THE INVENTION

A convenient and efficient method has now been discovered for coloring expandable thermoplastic polymeric materials in particulate form. When coloring polymeric particles in accordance with this new method it is not necessary to suspend the particles in an aqueous medium; therefore, the newly discovered procedure can be used for dyeing polymeric particles of any size. This new process has the added advantage of economy over the above described suspension dyeing processes due to the fact that since the polymeric particles are not suspended in an aqueous medium there is no need to subsequently dry them. In addition, expandable polymeric particles which have been colored by this new process have a uniform distribution of dye throughout the interior portions. Accordingly, it is an object of the invention to present an improved method of coloring thermoplastic polymeric materials in particulate form. It is a second object of the invention to present a simplified process for preparing colored expandable thermoplastic polymeric particles having a uniform distribution of dye throughout their interiors. It is a third object of the invention to present uniformly colored expandable thermoplastic polymeric compositions in particulate form which have little or no tendency toward crocking. It is a forth object to present a process for coloring thermoplastic polymeric particles having a wide particle size range. These and other objects of the invention will become more apparent as the description proceeds.

The process of the invention is as follows: Expandable thermoplastic polymeric particles are blended with a non-aqueous solution comprised of an organic liquid-soluble dye, an inert organic diluent and an organic dyeing adjuvant for a sufficient period of time to effect the uniform distribution of the dye throughout the interiors of the polymer particles. The dyeing process is conveniently conducted under ambient conditions of temperature and pressure, although, as hereinafter described, it may sometimes be convenient to use elevated pressure. The expandable thermoplastic polymer is substantially insoluble in the organic diluent and substantially soluble in the organic dyeing adjuvent.

DESCRIPTION OF THE INVENTION

Any expandable thermoplastic polymers which can be colored by organic liquid-soluble dyes can be colored by the process of this invention. The process is particularly suitable for coloring expandable alkenyl aromatic polymers, i.e., expandable polymers made from polymerizable compounds containing an aromatic nucleus to which is attached an alkenyl group. The latter group of compounds are commonly called alkenyl aromatic monomers. Typical alkenyl aromatic polymers are polystyrene, polyvinyltoluene, polyalpha-methylstyrene, etc. The preferred expandable alkenyl aromatic polymer is expandable polystyrene.

Other monomeric materials copolymerizable with the alkenyl aromatic monomer may be present in minor amounts provided they do not interfere with the polymerization or adversely affect the ability of the polymeric material to expand or otherwise adversely affect the physical properties of the desired product. Examples of other monomeric materials which can be suitably copolymerized with the alkenyl aromatic monomers are nitriles, such as acrylonitrile and methacrylonitrile and acrylates and methacrylates, such as ethylacrylate and methyl methacrylate. In addition, rubbery polymers such as polybutadiene may be present in very small amounts in the expandable polymeric composition.

The term "inert organic diluents," as used in the discussion, means organic liquids in which the polymer being colored is substantially insoluble. Typical of the inert organic diluents which may suitably be used in the invention are aliphatic hydrocarbons. It is advantageous to use as the inert organic diluent a compound which has a relatively low boiling point, so that the diluent easily evaporates from the polymeric composition. Especially suitable diluents are those which are liquids under normal atmospheric pressures and which have an atmospheric boiling point of not more than a few degrees centigrade above the softening point of the polymer being colored. In the preferred embodiment of the invention the inert organic diluent has an atmospheric boiling point of about 20 to about 100° C. Particularly preferred diluents are aliphatic hydrocarbons of about 4–8 carbon atoms. Exemplary of compounds which fall into this category are the saturated aliphatic hydrocarbons such as pentane, hexane and heptane and unsaturated aliphatic hydrocarbons such as hexene and heptene. It is convenient to use as the inert diluent the same organic compound that has been incorporated into the polymeric composition as a blowing agent. The preferred inert organic diluent is pentane.

In some cases it may be desirable to use an inert organic diluent or dyeing adjuvant having an atmospheric boiling point lower than the temperature at which it is desired to conduct the coloring process. In these instances the process can be carried out under superatmospheric pressure. This procedure may be used when it is desired to use compounds such as butane as the inert organic diluent or dichlorofluoromethane as the dyeing adjuvant.

The term "dyeing adjuvant" as used in this discussion, means an organic liquid in which the polymer being colored is substantially soluble. Any organic liquid in which the polymer is soluble may be used as a dyeing adjuvant in the invention. Typical compounds which may be used as dyeing adjuvants are low boiling aromatic compounds such as benzene and toluene, alicyclic hydrocarbons such as cyclopentane and cyclohexane, and lower ketones such as acetone and methylethyl ketone. It is preferred that the dyeing adjuvant used have a relatively low boiling point so that it will quickly evaporate from the polymer prior to or during subsequent molding operations and thus not affect the softening point of the finished product. Particularly suitable dyeing adjuvants are those which have an atmospheric boiling point of not more than a few degrees above the softening point of the polymer being colored. In the preferred embodiment the dyeing adjuvant will have an atmospheric boiling point of about 20 to about 100° C. The preferred dyeing adjuvant is trichlorofluoromethane.

In general, any organic liquid-soluble dye is suitable for use in the invention. For purposes of the present discussion "organic liquid-soluble dye" means that the dye is substantially soluble in organic liquids. Organic liquids includes the inert organic diluents and dyeing adjuvants used in this invention. Typical useful dyes are the azo, anthraquinone, azine, and quinoline dyes. Specific dyes and their color indices and colors which have been found suitable are presented below in tabular form:

| Dye | Color index | Color |
|---|---|---|
| Solvent yellow 2 | 11020 | Yellow. |
| Solvent yellow 14 | 12055 | Do. |
| Solvent yellow 33 | 47000 | Do. |
| Solvent orange 7 | 12140 | Orange. |
| Solvent green 3 | 61565 | Green. |
| Solvent red 24 | 26105 | Red. |
| Solvent red 26 | 26120 | Red. |
| Solvent blue 7 | 50400 | Blue. |
| Solvent violet 13 | 60725 | Violet. |
| Solvent violet 14 | 61705 | Do. |
| Solvent blue 59 | (1) | Blue. |

[1] 1,4-diethylaminoanthraquinone.

Although the exact mechanism of the invention is not known with certainty it is believed the principal function of the dyeing adjuvant is to partially dissolve the skin formed on the surface of the expandable thermoplastic polymeric particles to render them more permeable to the dye. This permits a more rapid and deeper penetration of the dye into the interior portions of the polymeric particles. The dyeing adjuvant also has a secondary function; it partially dissolves the organic dye being used to color the polymeric particles.

The inert organic diluent also appears to serve a dual purpose in the invention. In addition to partially dissolving the dye it dilutes the dyeing adjuvant so that it is distributed substantially uniformly throughout the batch of polymeric particles being colored. This is important because it prevents the direct contact of full strength dyeing adjuvant with the polymeric particles. If this were permitted to occur the particles or groups of particles coming into contact with the undiluted adjuvant would become very viscous or tacky and fuse together and form several large masses of agglomerated polymeric particles, thereby ruining the batch of polymer. By diluting the dyeing adjuvant so that it is uniformly distributed throughout the batch substantially all of the polymeric particles will come in contact with the diluted dyeing adjuvant and be rendered more permeable to the dye without otherwise affecting the character of the particles.

The total amount of inert organic diluent and dyeing adjuvant used in the process should be sufficient to totally dissolve all of the organic dye used in the coloring process. The organic diluent must be present in an amount sufficient to satisfactorily dilute the dyeing adjuvant and totally dissolve, together with the dyeing adjuvant, the dye present; however, it should not be present in an amount so great that it dilutes the dyeing adjuvant beyond the point where it can effectively improve the rate and degree of influx of the dye into the polymeric particles.

The total amount of inert organic diluent and dyeing adjuvant used in the process should be sufficient to totally dissolve all of the organic dye used in the coloring process. The organic diluent must be present in an amount sufficient to satisfactorily dilute the dyeing adjuvant and totally dissolve, together with the dyeing adjuvant, the dye present; however, it should not be present in an amount so great that it dilutes the dyeing adjuvant beyond the point where it can effectively improve the rate and degree of influx of the dye into the polymeric particles.

In general, it has been found the amount of dyeing adjuvant may vary from about 0.05 to about 1.0%, based on the total weight of polymer being colored with the preferred amount being in the range of about 0.08 to about 0.8%. Although lower amounts in some cases may be useable, it has ben found that in general if the amount of dyeing adjuvant is less than 0.05% the dye does not diffuse uniformly through the particles and the centers may be undyed or only slightly dyed. On the other hand, if the amount of dyeing adjuvant used is substantially greater than about 1.0% the particles tend to become excessively tacky and adhere to one another.

The amount of inert organic diluent used in the process of the invention may vary from about 0.1 to about 5% and it is preferable to use it in an amount of about 0.1 to about 2%, based on the weight of polymer being colored. The ratio of inert organic diluent to dyeing adjuvant may vary from about ten parts of diluent per one part of dyeing adjuvant to about one part of diluent per five parts of dyeing adjuvant.

Any amount of dye effective to produce the desired results can be used, the usual concentration range being about 0.005 to about 5.0 percent, by weight of the polymer. If it is desired that the polymer be colored a lighter shade, a smaller amount of dye is used. The maximum depth of color obtainable by the use of suitable dyes is generally obtained by the use of an amount within the given range. An amount of dye greater than about 5 percent, based on the weight of the polymer, usually does not produce any additional deeping of color.

The method used to blend the dye with the polymer is not critical as long as the dye is uniformly distributed in the polymer batch. It is preferable to apply the dye solution to the polymer in such a manner that it contacts all of the polymeric particles, e.g. by spraying it over the polymer while it is being tumbled. The period of time necessary to effect the satisfactory distribution of the dye in the polymer will vary depending upon the particular dyeing adjuvants and organic diluents used and the concentrations at which they are used, the efficiency of the blending equipment employed, the size of the polymeric particles being colored, etc. The optimum conditions for obtaining the desired results can easily be determined by experimentation.

The colored polymer may be either used immediately after the dye is blended into the polymer or it may be stored for future use. It may be desirable in some cases to age the polymeric material by storing it in a suitable container. This would be the case if it were desired to remove residual dyeing adjuvant from the polymer or to permit further equilibration of the dye in the polymeric particles.

This is in accordance with a preferred embodiment of the present invention where there is provided a process for the non-aqueous dyeing of expandable alkenyl aromatic polymer in particulate form consisting essentially of uniformly distributing on said polymer a mixture of an organic liquid-soluble dye, about 0.05 to 1.0 part per 100 parts of polymer of a dyeing adjuvant which is an organic liquid having an atmospheric boiling point of about 20° C. to about 100° C. and in which the polymer being dyed is substantially soluble, and about 0.1 to 5.0 part per 100 parts of polymer of an inert organic diluent until said dye is uniformly dispersed throughout the polymer.

In accordance with a particularly preferred embodiment of the present invention there is provided a process for dyeing expandable alkenyl aromatic polymer in particulate form by blending the polymer particles with a non-aqueous solution of:

(a) about 0.01 to about 5% of an organic liquid-soluble dye
(b) about 0.05 to about 1.0% of dyeing adjuvant which is an organic liquid having an atmospheric boiling point of about 20° C. to about 100° C. and in which the polymer being dyed is substantially soluble, and
(c) about 0.1 to about 5.0% of an inert organic diluent having a boiling point of up to about 100° C., said percentages being based on the weight of polymer.

The invention is further illustrated by the following example in which parts and percentages are on a weight basis.

EXAMPLE I

A dye solution is made by combining in a suitable container 0.34 part of pentane, 0.16 part of trichlorofluoromethane and 0.22 part of a blue organic liquid-soluble dye sold under the trademark Calco Oil Blue N. The mixture is stirred until the dye is completely dissolved. The dye solution is then blended with 100 parts of expandable polystyrene beads containing pentane as the blowing agent in a rotating drum tumbler for fifteen minutes. The beads are then removed from the blender and examined. The beads have a uniform color throughout the batch. Representative portions of the beads are pre-expanded in a batch pre-expander. The pre-expanded beads are examined and found to be uniformly dyed throughout their interiors. Some of the pre-expanded beads are molded into blocks in conventional molding equipment. The time required to cool the molded item is considerably less than the time required to cool blocks molded under the same conditions from conventionally dyed expandable polystyrene beads. The molded blocks are examined and found to be of high quality with good diffusion and good uniform color throughout. The molded blocks show good dye fastness.

Numerous modifications of the invention which are not specifically disclosed in the example will be readily apparent to those familiar with the preparation of dyed expandable thermoplastic particles and such modifications are considered to be within the spirit of the invention. The scope of the invention is limited only by the breadth of the appended claims.

I claim:

1. A process for the non-aqueous dyeing of expandable alkenyl aromatic polymer in particulate form whereby substantially uniform dyeing throughout the interior of the polymer particles is achieved by uniformly distributing on said polymer a mixture consisting essentially of (i) an organic liquid-soluble dye, (ii) about 0.05 to 1.0 part per 100 parts of polymer of a dyeing adjuvant which is an organic liquid in which the polymer being dyed is substantially soluble, said organic liquid having an atmospheric boiling point of about 20° C. to 100° C. and being an aromatic hydrocarbon, a cycloaliphatic hydrocarbon, a halogenated hydrocarbon or a ketone and (iii) about 0.1 to 5.0 part per 100 parts of polymer of an inert organic diluent in which the polymer being dyed is substantially insoluble until said dye is uniformly dispersed throughout the polymer.

2. A process according to Claim 1 wherein said diluent is present in an amount of about 0.1 to 2.0 part of 100 parts of polymer.

3. A process according to Claim 1 which is conducted under ambient conditions of temperature and pressure.

4. A process according to Claim 1 wherein said dyeing adjuvant is present in an amount of about 0.08 to 0.8 part per 100 parts of polymer.

5. A process for the non-aqueous dyeing of expandable alkenyl aromatic polymer in particulate form whereby substantially uniform dyeing throughout the interior of the polymer particles is achieved by blending the polymer particles with a solution consisting essentially of:

(a) about 0.01 to about 5% of an organic liquid-soluble dye,
(b) about 0.05 to about 1.0% of dyeing adjuvant which is an organic liquid and in which the polymer being dyed is substantially soluble, said organic liquid having an atmospheric boiling point of about 20° C. to 100° C. and being an aromatic hydrocarbon, a cycloaliphatic hydrocarbon, a halogenated hydrocarbon or a ketone, and
(c) about 0.1 to about 5.0% of an inert organic diluent which has a boiling point of up to about 100° C., and in which the polymer being dyed is substantially insoluble;
said percentages being based on the weight of polymer.

6. The process of Claim 5 wherein the inert organic diluent has a boiling point in the range of about 20° to 100° C.

7. The process of Claim 5 wherein said dyeing adjuvant is present in an amount of about 0.08 to 0.8% based on the weight of polymer.

8. A process of Claim 5 wherein said inert organic diluent is present in an amount of about 0.1 to about 2.0% based on the weight of polymer.

9. A process according to Claim 5 wherein said alkenyl aromatic polymer is polystyrene.

10. A process according to Claim 5 wherein said inert organic diluent is an aliphatic hydrocarbon containing about 4 to 8 carbon atoms.

11. A non-aqueous process for dyeing expandable polystyrene particles whereby substantially uniform dyeing throughout the interior of said particles is achieved by blending the particles with a non-aqueous solution consisting of essentially of about 0.01 to about 5% of an organic solvent-soluble dye; about 0.5 to about 5% of a member selected from the group consisting of butane, pentane, hexane, heptane, and mixtures of these; and about 0.05 to about 1.0% of trichlorofluoromethane, said percentages being based on the total weight of polymer.

12. The process according to Claim 11 wherein said inert organic diluent is pentane.

13. In a process for dyeing expandable alkenyl aromatic polymer in particulate form by blending the polymeric particles with an organic liquid-soluble dye; wherein the improvement consists essentially of blending the particles with a non-aqueous solution of the dye, and inert organic diluent which has a boiling point of about 20° to 100° C., and in which the polymer being dyed is substantially insoluble, and a dyeing adjuvant which is an organic liquid having an atmospheric boiling point of about 20° C. to about 100° C. in which the polymer being dyed is substantially soluble and which is an aromatic hydrocarbon, cycloaliphatic hydrocarbon, halogenated hydrocarbon or ketone, the ratio of the diluent to the dyeing adjuvant being in the range of about 10:1 to 1:5.

14. The process according to Claim 13 wherein said solution contains about 0.05 to about 1.0 part, per 100 parts of polymer of dyeing adjuvant.

15. The process of Claim 14 wherein said dyeing adjuvant is trichlorofluoromethane and said diluent is pentane.

16. The process of Claim 15 wherein said polymer is polystyrene.

17. The process of Claim 1 wherein (a) the polymer is expandable polystyrene in bead form, (b) the inert organic diluent is an aliphatic hydrocarbon containing about 4 to 8 carbon atoms and is employed in an amount of about 0.1 to 2.0 parts per 100 parts polystyrene, (c) the dyeing adjuvant is employed in an amount of about 0.08 to 0.8 parts per 100 parts polystyrene, and (d) the ratio of diluent to dyeing adjuvant is about 2 to 1.

References Cited
UNITED STATES PATENTS

| | | | |
|---|---|---|---|
| 3,524,718 | 8/1970 | Napor et al. | 8—13 |
| 3,502,495 | 3/1970 | Akamatsu | 106—32 |
| 3,129,053 | 4/1964 | Castle | 8—4 |
| 2,384,001 | 9/1945 | Wesson | 8—4 |
| 3,399,025 | 8/1968 | Nicholson | 260—2.5 B |
| 3,020,247 | 2/1962 | Bianco | 260—2.5 B |
| 3,632,288 | 1/1972 | Niechwiadowicz | 260—2.5 B |

MORTON FOELAK, Primary Examiner

U.S. Cl. X.R.

8—4, 83, 93, 94; 260—32.8 R, 33.6 UA, 33.8 UA